UNITED STATES PATENT OFFICE.

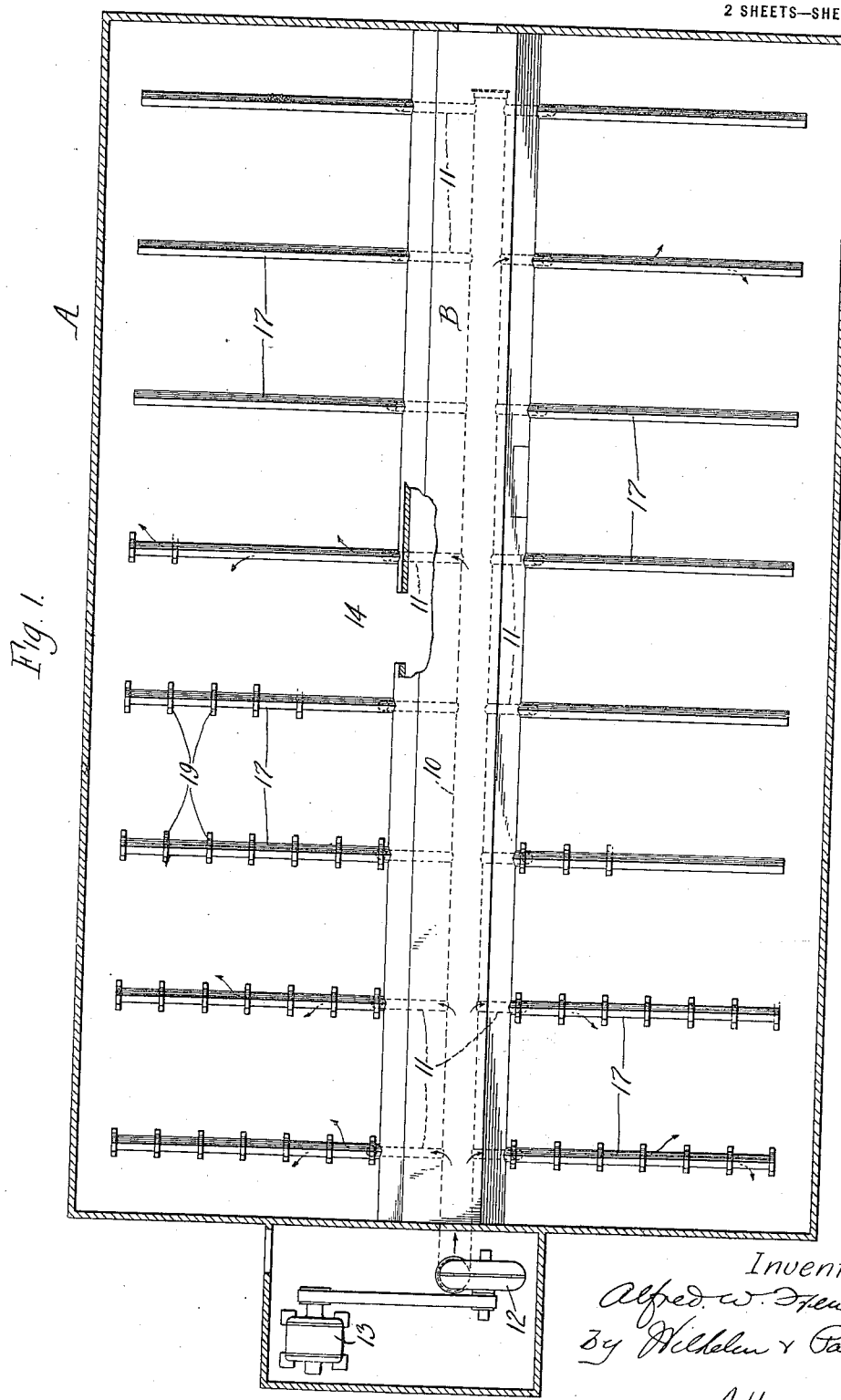

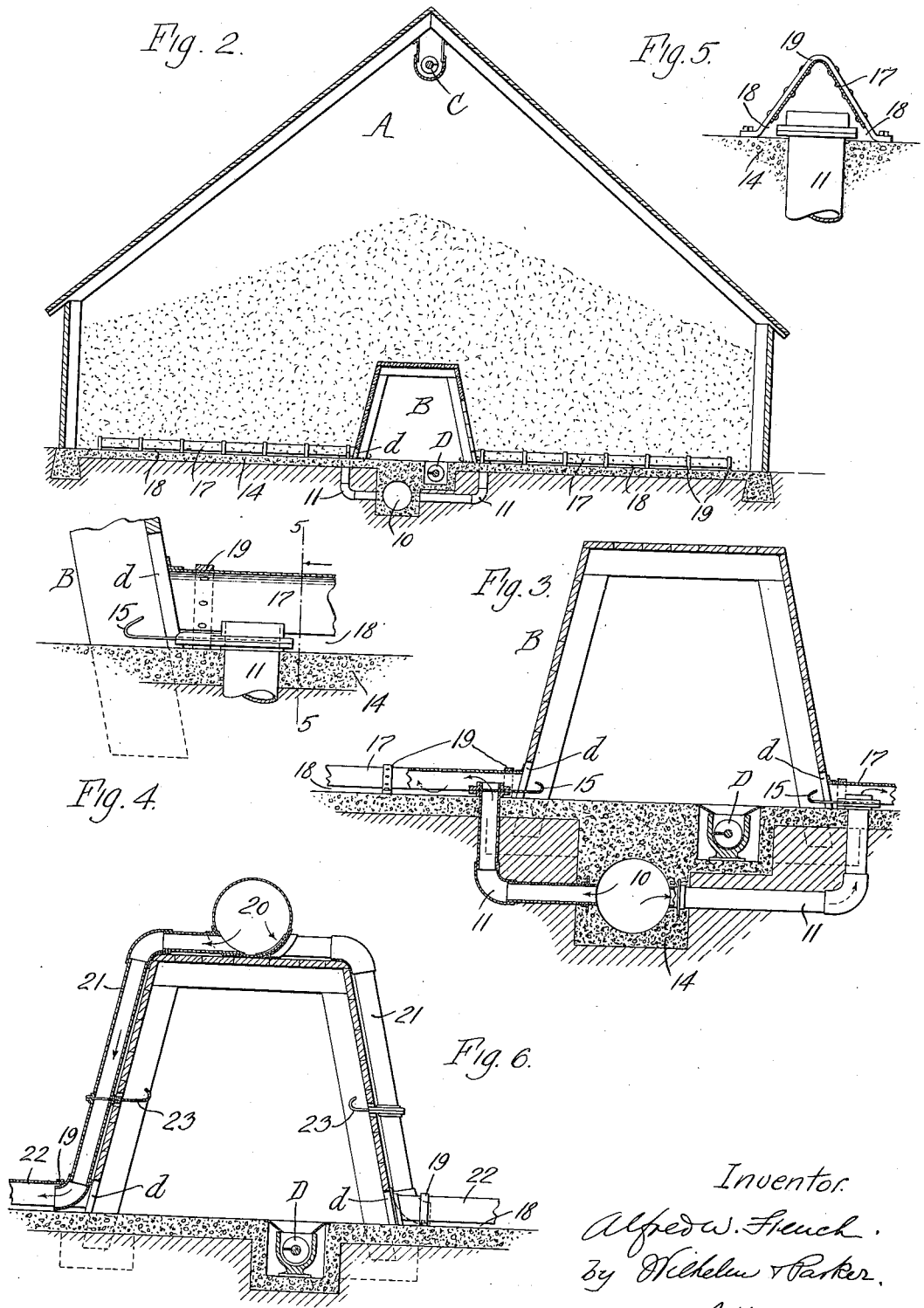

ALFRED W. FRENCH, OF PIQUA, OHIO.

VENTILATING MEANS FOR SEED-HOUSES.

1,256,677.  Specification of Letters Patent.  Patented Feb. 19, 1918.

Application filed April 4, 1916. Serial No. 88,799.

*To all whom it may concern:*

Be it known that I, ALFRED W. FRENCH, a citizen of the United States, residing at Piqua, in the county of Miami and State of Ohio, have invented a new and useful Improvement in Ventilating Means for Seed-Houses, of which the following is a specification.

This invention relates to improvements in ventilating means for seed houses, in which seed or grain is stored, and the object of the invention is to provide efficient and economical means of simple construction and which can be installed at a moderate expense whereby air can be distributed as required through the seed or grain for preventing it from heating or for driving off the moisture and cooling seed which has become heated.

Seed houses are commonly built with a tunnel or passage extending through them to afford access for shoveling the seed or grain from any desired section of the house into a discharge conveyer in the floor of the tunnel. According to this invention an air supply conduit connected with a suitable fan or source of air supply preferably extends lengthwise of this tunnel and is provided at suitable intervals along its length with branch pipes for discharging the air into the seed house at various points, these branch pipes being controlled by valves which are accessible from the tunnel so that they can be readily adjusted to secure a desired distribution of the air through seed or grain in a part or parts of the seed house.

In the accompanying drawings:—

Figure 1 is a sectional plan view of a seed house provided with air distributing means embodying the invention.

Fig. 2 is a transverse sectional elevation thereof.

Fig. 3 is an enlarged transverse sectional elevation of the tunnel and air distributing means.

Fig. 4 is a fragmentary similar view on a still larger scale showing one of the branch air pipes and air distributers.

Fig. 5 is a sectional elevation thereof in line 5—5, Fig. 4.

Fig. 6 is a transverse sectional elevation showing a modified construction.

A represents a seed house of ordinary construction provided with a tunnel or passage B extending lengthwise through the lower portion of the house to afford access to different parts thereof; with a feed conveyer C extending lengthwise in the upper portion of the house and adapted to deliver the seed or grain into different parts of the house; and with a discharge conveyer D in the floor of the tunnel into which the seed or grain can be shoveled from any desired section of the house for discharging the grain. The side walls of the tunnel, as usual, are formed to leave openings $d$ along the bottom thereof through which the seed can be shoveled or are provided with suitable doors or removable sections which can be opened to allow the seed or grain to be shoveled out and to permit one to pass from the tunnel into the seed chamber of the house. The seed or grain covers the tunnel.

10 represents the main air supply conduit which extends lengthwise of the seed house and 11 represents branch pipes or laterals leading from the supply conduit into the seed house to points at opposite sides of the tunnel. Air is supplied to the main conduit under a light pressure, as by means of a fan blower 12 connected with one end of the conduit and driven by a motor 13.

In the construction shown in Figs. 1 to 5, the main supply conduit 10 consists of a passage formed in the concrete floor 14 of the seed house beneath the tunnel and the branch pipes or laterals 11, which are preferably metal pipes, are set in the concrete connecting at one end with the main conduit and having their other ends extending up through the floor of the seed house at opposite sides of the tunnel. This construction is desirable on account of its cheapness since it avoids the connections with the laterals being made of steel or other metal which is expensive. The concrete work can be easily made with suitable forms and the laterals can be laid in place as the work progresses. This construction is also desirable in that the mill where the work is being done can make the concrete conduit if it desires to do so, and the pipes for the laterals furnished with the elbows and of the required dimensions can be purchased from the manufacturer ready to be set in the concrete. Each of the branch pipes or laterals is provided above the floor of the seed house with a suitable valve 15 for controlling the discharge of air from this pipe, all of the valves being arranged so that they can be readily adjusted by a person in the tunnel B. Slide valves are shown for this purpose having operating handles extending into the tunnel through suitable openings in the side walls thereof.

Preferably, each of the branch pipes terminates at its upper or discharge end beneath an air distributer 17, which, as shown, is of inverted V-shape or trough-shape and is supported over the end of the branch air pipe on the floor of the seed house with its bottom edges spaced slightly from the floor to leave spaces 18 along the side edges of the distributer for the escape of the air therefrom. The distributer is conveniently made, as shown in Figs. 4 and 5, of a thin metal plate bent into substantially inverted V-shape and having riveted thereon metal cross straps 19 which exend below the lower edges of the plate and form feet or legs for supporting the lower edges of the plate off of the floor to form the spaces 18 through which the air escapes from the air distributer into the seed house at the bottom of the pile of seed or grain. The air distributer is made strong enough to sustain the weight of the body of grain bearing thereon and it prevents the grain from getting into and choking the branch air pipe. As shown in Fig. 5, the legs of the air distributer can be bolted to the floor of the seed house, but this is not essential since the distributers could be simply laid loosely on the floor over the branch pipes.

By the use of the distributers constructed and arranged as described the installation of the apparatus is greatly simplified and cheapened because the distributers can be made at the factory of the proper size and can be placed in position by unskilled labor, since there are no connections to be made between the same and the air pipes. The described construction also necessitates very little tearing up of the floor of the seed house.

In the construction shown in Fig. 6, the main air conduit is formed by a metal pipe 20 extending lengthwise on top of the tunnel and the branch pipes 21 extend therefrom downwardly at opposite sides of the tunnel with their discharge ends projecting beneath air distributers 22 like those used in the first construction described. The branch pipes are furnished with controlling valves 23 which are arranged so that they can be adjusted from the inside of the tunnel.

With either of the constructions described, the valves can be readily adjusted so as to distribute the air as required through the seed or grain in a part of parts of the house.

I claim as my invention:

1. Ventilating means for seed in seed houses, and the like, comprising a plurality of air distributing flues extending substantially horizontally in the lower part of the house under the seed, and having provision for the escape of the air from the flues at various points along the length of the flues, means which support the flues at various points throughout their length, means for supplying air under pressure to the several flues, and means for controlling the delivery of air independently to the several distributing flues.

2. Ventilating means for seed in seed houses, and the like, comprising a plurality of air distributing flues extending substantially horizontally in the lower part of the house under the seed, and having openings for the escape of the air from the flues at various points along the length of the flues, said openings being so disposed that they will not be closed by the seed at its natural angle of repose, means which support the flues, an air supply pipe for supplying air under pressure to the several flues, and means for controlling the delivery of air from said supply pipe independently to the several distributing flues, whereby the distribution of air can be controlled and the air can be concentrated at desired points.

3. Ventilating means for seed in seed houses and the like, comprising an inverted trough-like air distributer provided at its sides with legs which rest on the floor of the house and support the distributer with its edges spaced from the floor to allow the escape of air from the distributer, and air supply means arranged to deliver air to said distributer.

4. Ventilating means for seed in seed houses and the like, comprising an inverted trough-like air distributer, supports located at intervals along the distributer which rest on the floor of the house and support the distributer with its edges spaced from the floor to allow the escape of air from the distributer, and air supply means arranged to deliver air to said distributer.

5. Ventilating means for seed in seed houses and the like, comprising a plurality of air distributer flues extending substantially horizontally under the seed and having imperforate walls at their sides and upper portions and being open at their bottoms for the escape of air, supports located at intervals along the distributers which support said distributers spaced from the floor to allow the escape of air from the distributers, and air supply means including independently controllable branch flues each arranged to deliver air under one of said distributers.

6. Ventilating means for seed in seed houses and the like, comprising a series of inverted trough-like air distributers supported on the floor of the house under the seed and providing openings at the sides of the distributers to allow the escape of air therefrom, and air supply means comprising said floor having a concrete part provided with a passage therein forming a main conduit, and branch pipes set in said concrete and each leading from said main conduit and arranged to deliver air under said distributers.

Witness my hand this 31st day of March, 1916.

ALFRED W. FRENCH.

Witnesses:
C. W. PARKER,
A. L. McGEE.